US 7,742,502 B2

(12) United States Patent
Vissers et al.

(10) Patent No.: US 7,742,502 B2
(45) Date of Patent: Jun. 22, 2010

(54) METHOD AND APPARATUS FOR TRANSPORTING A CLIENT LAYER SIGNAL OVER AN OPTICAL TRANSPORT NETWORK (OTN)

(75) Inventors: Maarten Vissers, Be Huizen (NL); Günter Grüell, Stuttgart (DE)

(73) Assignee: Alcatel, Paris (FR)

( * ) Notice: Subject to any disclaimer, the term of this patent is extended or adjusted under 35 U.S.C. 154(b) by 899 days.

(21) Appl. No.: 11/255,203

(22) Filed: Oct. 21, 2005

(65) Prior Publication Data

US 2006/0104309 A1    May 18, 2006

(30) Foreign Application Priority Data

Nov. 12, 2004   (EP)   ................... 04026902

(51) Int. Cl.
*H04J 3/24*   (2006.01)
(52) U.S. Cl. .................. 370/473; 370/474; 370/475; 370/476; 370/389; 370/537; 370/543; 370/907
(58) Field of Classification Search ......... 370/473–476, 370/300, 389–393, 537–543, 907
See application file for complete search history.

(56) References Cited

U.S. PATENT DOCUMENTS

| 7,187,650 | B2 * | 3/2007 | Xiong et al. | ................. 370/235 |
| 7,245,633 | B1 * | 7/2007 | Mueller | ....................... 370/466 |
| 7,415,207 | B2 * | 8/2008 | Lanzone et al. | ............... 398/46 |
| 2002/0027929 | A1 * | 3/2002 | Eaves | ......................... 370/505 |
| 2003/0021299 | A1 * | 1/2003 | Ota | ............................. 370/535 |
| 2004/0062277 | A1 * | 4/2004 | Flavin et al. | ................. 370/474 |
| 2004/0114638 | A1 * | 6/2004 | Matsuura et al. | ............ 370/537 |
| 2004/0202198 | A1 |  | 10/2004 | Walker et al. |

FOREIGN PATENT DOCUMENTS

EP       1 363 426 A1     11/2003

(Continued)

OTHER PUBLICATIONS

S. Gorshe et al, "Transparent Generic Framing Procedure (GRP); A Protocol for Efficient Transport of Block-Coded Data Through Sonet/SDH Networks", IEEE Communications Magazine, IEEE Service Center, Piscataway, NJ, US vol. 40, No. 5, May 2002, pp. 88-95, XP001129443.

(Continued)

*Primary Examiner*—Jason E Mattis
*Assistant Examiner*—Kibrom T Hailu
(74) *Attorney, Agent, or Firm*—Carmen Patti Law Group, LLC (57) ABSTRACT

In order to facilitate the transport of 1 Gbit/s Ethernet signals over an Optical Transport Network using the Optical Transport Hierarchy as specified by ITU-T G.709, a new OTH entity referred to as Optical Channel Data Unit-0 (ODU0, 101) with a capacity of approximately 1.22 Gbit/s is defined. This new entity fits perfectly into the existing OTH multiplexing structure, allowing the transport of two times a 1 Gbit/s Ethernet client layer signal within the capacity of one ODU1 (110), while being individually switchable. A 1 Gbit/s Ethernet signal (102) can be mapped into the ODU0 payload (103) using the Transparent Generic Framing Procedure (GFP-T) encapsulation technique as specified in Rec. G.7041.

13 Claims, 5 Drawing Sheets

FOREIGN PATENT DOCUMENTS

EP          1737147 A1     8/2005

OTHER PUBLICATIONS

International Telecommunication Union—ITU-T Recommendation G.709/Y.1331—Mar. 2003,—Interfaces for the Optical Transport Network (OTN) XP002292965.

International Telecommunication Union—ITU-T Recommendation G.7041/Y.1303—Dec. 2003.

International Telecommunication Union—ITU-T Recommendation G.872 dated Nov. 2001.

International Telecommunication Union—ITU-T Recommendation G.707/Y.1322 dated Dec. 2003.

* cited by examiner

METHOD AND APPARATUS FOR TRANSPORTING A CLIENT LAYER SIGNAL OVER AN OPTICAL TRANSPORT NETWORK (OTN)

The invention is based on a priority application EP 04026902.9 which is hereby incorporated by reference.

FIELD OF THE INVENTION

The present invention relates to the field of telecommunications and more particularly to a method and apparatus for transporting a client layer signal over an Optical Transport Network (OTN).

BACKGROUND OF THE INVENTION

Current transmission networks are mainly based on the Synchronous Digital Hierarchy abbreviated as SDH, see ITU-T G.707, 12/2003. A new hierarchy, the Optical Transport Hierarchy abbreviated as OTH has been standardized in ITU-T G.709 03/2003, which is incorporated by reference herein. The purpose of OTH is to deal more economically with very large bandwidths, which are termed Optical Channel Data Units and abbreviated as ODUs. Currently defined are ODU1 (~2.7 Gbit/s), ODU2 (~10.7 Gbit/s), and ODU3 (~43 Gbit/s). New efficient overlay networks can be defined, build and used by network operators based on this hierarchy. The architecture of optical transport networks is described in ITU-T G.872 (11/2001), which is also incorporated by reference herein.

As Ethernet is more and more upcoming as the primary transport format for data signals, 1 Gbit/s Ethernet signals would be a natural client signal for the business of OTH network operators.

The currently standardized method to transport a 1 Gbit/s Ethernet signal through an Optical Transport Network includes to map the 1 Gbit/s Ethernet signal into a concatenation of SDH Virtual Containers (SDH VCs) and than to map the framed SDH transport signal into an ODU. This can be seen for instance from ITU-T G7041 (12/2003) on page 47. The existing mapping of 1 Gbit/s signals into SDH Virtual Containers (SDH VCs) is, however, expensive as it requires to operate a functionally independent SDH network. This in many cases would not be necessary for backbone network operators only dealing with large capacities.

On the other hand, a mapping of a single 1 Gbit/s Ethernet into the smallest OTH entity (~2.7 Gbit/s) would, however, encompass an enormous waste of bandwidth.

As 1 Gbit/s Ethernet signals are currently gaining much importance as a main client signal to be transported in long-haul networks, there exists a need to ensure a cost effective transport of these signals.

It is therefore an object of the present invention to provide a method and related network element, which allows a more efficient transport of client signals over an optical transport network and which is particularly suited for the transport of 1 Gbit/s Ethernet signals.

SUMMARY OF THE INVENTION

These and other objects that appear below are achieved by the definition of a new OTH entity referred to as Optical Channel Data Unit-0.

In particular, a network element for an optical transport network is designed to handle optical transport signals structured in accordance with the Optical Transport Hierarchy. The Optical Transport Hierarchy provides at least three multiplex layers k with k=1, 2, and 3 and defines corresponding Optical Channel Data Units-k. The Optical Channel Data Units-k with k=1, 2, and 3 are of a size that four transport signals built from Optical Channel Data Units of a lower layer can be multiplexed into one transport signal built from Optical Channel Data Units of the next higher layer. Each Optical Channel Data Units-k has an overhead area and a payload area. The network element supports at least one of the multiplex layers k=1, 2, or 3 and corresponding Optical Channel Data Units-k, k=1, 2, or 3, respectively. According to the invention, the network element has at least one I/O port for processing a transport signal built from Optical Channel Data Units-0, which are of a size that two transport signals built from Optical Channel Data Units-0 can be multiplexed into one transport signal built from Optical Channel Data Units-1, and means for mapping a client layer signal into the payload area of said Optical Channel Data Units-0.

The invention therefore solves the economic burden of either to operate an additional underlying SDH network or to waste more than 50% of bandwidth in the case of mapping it into an ODU1. This doubles the capacity of 1 Gbit/s Ethernet signals that can be transported individually in an OTH signal.

BRIEF DESCRIPTION OF THE DRAWINGS

A preferred embodiment of the present invention will now be described with reference to the accompanying drawings in which.

DETAILED DESCRIPTION OF THE INVENTION

The basic multiplex entity in an Optical Transport Network (OTN) as specified in ITU-T Rec. G.872 is the Optical Channel Data Unit-k (ODUk) with k=1, 2, or 3. An ODUk when represented in the form of a table composed of columns and rows has an overhead area and a payload area. The Overhead area of an ODUk is composed of 16 columns by 4 rows, where columns 1 to 7 of row 1 are reserved for frame alignment purposes, columns 8 to 14 of row 1 are reserved for OTU-specific overhead (Optical Channel Transport Unit) and columns 15 and 16 are reserved for OPU-specific overhead (OPU: Optical Channel Payload Unit), while the remainder of the overhead area is available for the ODU overhead. The payload area, on the other hand, has 3808 columns by 4 rows. Either a client layer signal can be mapped into the payload area or a number of ODUs of a lower layer which are interleaved to what is called an Optical Channel Data Tributary Unit Group (ODTUG). Transmission of an ODUk is row by row. The Optical Transport Hierarchy (OTH) that describes the multiplexing scheme in more detail is specified in ITU-T G.709 (3/2003).

An 1000BASE-X signal (specified in IEEE 802.3) with its bit rate of 1.25 Gbit/s±100 ppm after 8B/10B encoding can be mapped as a client layer signal into an OPU1 (Optical Payload Unit-1) via GFP-T encapsulation (see ITU-T Rec. G.7041) for transmission over the Optical Transport Network (OTN). 1000BASE-X signals are commonly referred to as 1 Gbit/s Ethernet or simply 1GE signals.

As the real bandwidth of an OPU1 is, however, approximately 2.5 Gbit/s, this mapping would waste bandwidth and granularity. The bandwidth efficiency would be only about 50%. This is not too concerning on metro WDM line systems where low cost and simple mappings are an advantage. When carried however through an OTH network with DWDM line systems, a 100% increase in bandwidth efficiency and ODUk multiplexing granularity will make such network more economical given the increasing importance of 1 GE connections.

Therefore, a basic idea of the present invention is the definition of a new OTH entity referred to hereinafter as Optical Channel Data Unit-0 (ODU0) with a capacity of approximately 1.22 Gbit/s. This new entity fits perfectly into the existing OTH multiplexing structure, allowing the transport of two times a 1 Gbit/s Ethernet client layer signal within the capacity of one ODU1, while being individually switchable (ODU0 switching).

For this purpose, each of the existing OPUk Tributary Slots (TS) is split into two. Each new Tributary Slot represents a bandwidth of 238/(239-k)*1.244160 Gbit/s±20 ppm.

This split results in the following values:

TABLE 1

Bandwidth of existing Optical Payload Units (OPUk)

| Optical Payload Unit (OPUk) | Bandwidth of the OPUk payload area | Number of contained TS | Bandwidth of a single TS |
|---|---|---|---|
| OPU1 | 2.488320 Gbit/s | 2 | 1.244160 Gbit/s |
| OPU2 | 9.995276962 Gbit/s | 8 | 1.24940962 Gbit/s |
| OPU3 | 40.150519322 Gbit/s | 32 | 1.254703729 Gbit/s |

With $k \geq 1$ the OPU1 Tributary Slots are the smallest ones, each having a bandwidth of 1.244160 Gbit/s±20 ppm. The new ODU0 must fit the smallest OPU Tributary Slot. The ODU0 bit rate is therefore 1,244160 Gbit/s±20 ppm.

Such an ODU0 can be fitted into the OPU1, OPU2 and OPU3 Tributary Slots with −1/0/+1/+2 ODU justification scheme (as specified in clause 19 of recommendation G.709). The mapping into an OPU2 and OPU3 Tributary Slot requires the addition of some additional fixed stuff columns as described below.

With the ODU0 bit rate known, the OPU0 payload bit rate can be determined with the above formula:

$$OPUk \text{ payload bit rate with } k = 0: = 238/(239 - k) * 1,244160 \text{ Gbit/s}$$

$$= 238/239 * 1,244160 \text{ Gbit/s}$$

$$= 1,238954309 \text{ Gbit/s} \pm 20 \text{ ppm}.$$

This bit rate is lower than the bit rate of the 8B/10 B encoded 1000 BASE-X (1 GE) signal (i.e. 1.25 Gbit/s±100 ppm), and it is therefore not possible to fit the 1 GE bit stream directly into this ODU0 payload. Instead the Transparent Generic Framing Procedure (GFP-T) encapsulation technique as specified in ITU-T Rec. G.7041 is used.

Figure 1:
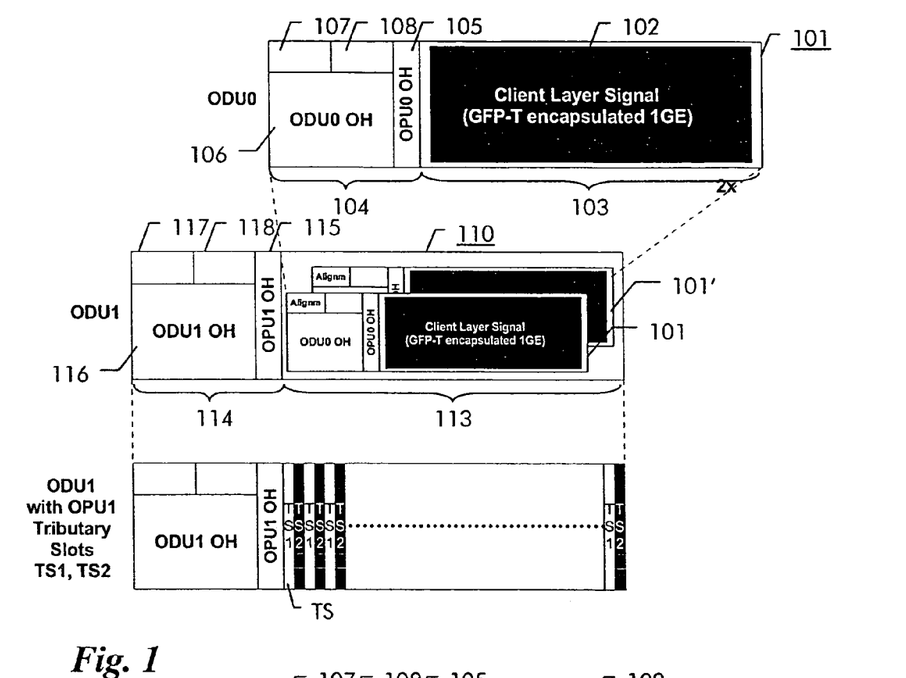
FIG. 1 shows the multiplexing of the new entity ODU0 into ODU1.
Figure 2:
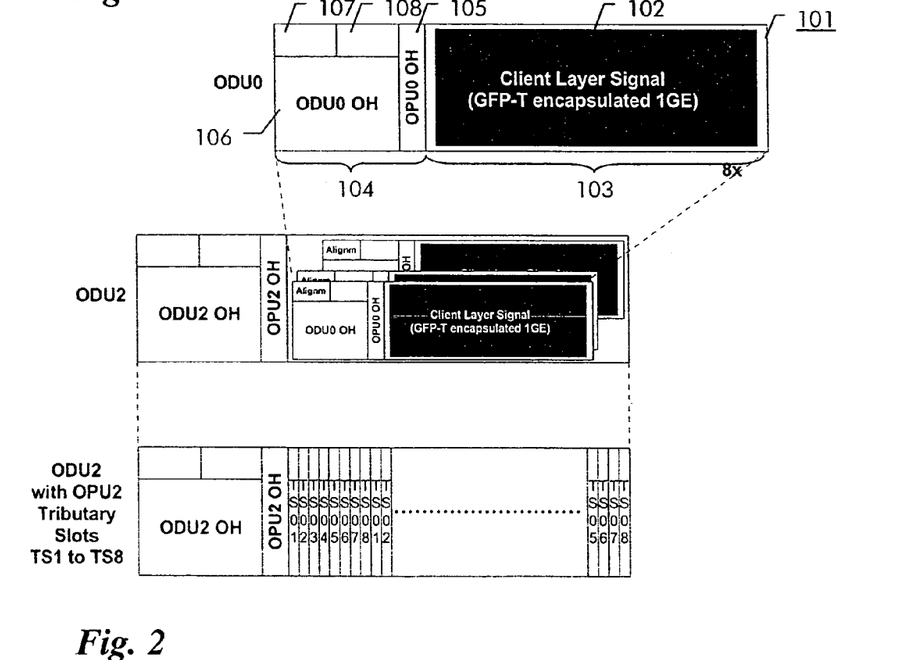
FIG. 2 shows the multiplexing of ODU0 into ODU2.
Figure 3:
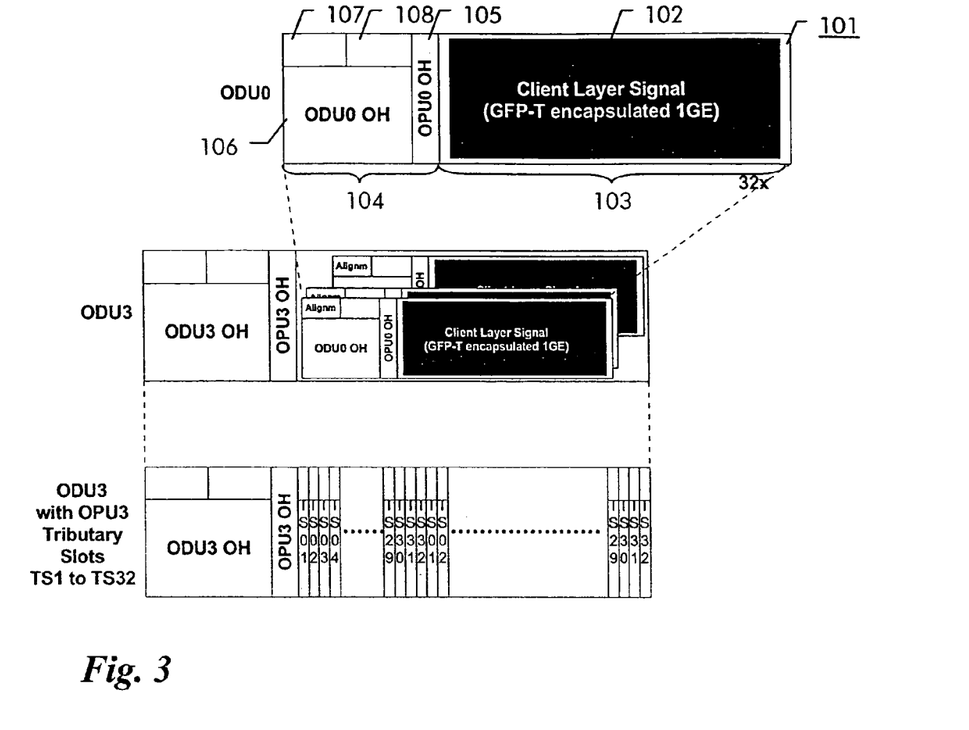
FIG. 3 shows the multiplexing of ODU0 into ODU3.

FIGS. 1, 2 and 3 illustrate the mapping of a 1 GE signal via GFP-T into an ODU0, the multiplexing of 2, 8 or 32 ODU0s into an ODU1, ODU2 or ODU3, respectively, and the allocation of OPUk Tributary Slots in OPU1, OPU2 and OPU3.

In the upper part of FIG. 1, an ODU0 101 is shown with its payload area 103 and its overhead area 104. The overhead area 104 has an area 105 reserved for OPU-specific overhead, an area 106 reserved for ODU-specific overhead, an area 107 reserved for alignment-specific bytes, and an area 108 for OTU-specific overhead. A GFP-T encoded 1 Gbit/s Ethernet signal (1 GE) 102 is mapped into the payload area 103.

In the middle part of FIG. 1 it is shown schematically how two ODU0s 101, 101' are multiplexed and mapped into the payload area 111 of an ODU1 110. The ODU1 110 contains a payload area 113 and an overhead area 114. Similar to the ODU0, the overhead area 114 has an area 115 reserved for OPU-specific overhead, an area 116 reserved for ODU-specific overhead, an area 117 reserved for alignment-specific bytes, and an area 118 for OTU-specific overhead.

In the bottom part of FIG. 1, the physical assignment of bytes into the two interleaved tributary slots in the payload area is shown. Each ODU0 occupies each second tributary slot (TS1, TS2) in the payload area 113. The OPU1 overhead 115 contains one column of justification control and opportunity overhead for each of the two tributary slots in a 2-frame multiframe format. This is not illustrated in FIG. 1.

It has to be noted that the ODU0 floats in one half of the OPU1 payload area. An ODU0 frame will cross multiple ODU1 frame boundaries. A complete ODU0 frame, which has 15296 bytes, requires the bandwidth of one tributary slot in 15296/7616=2,008 ODU1 frames. This is not illustrated in FIG. 1.

The mapping will be explained in more detail with respect to FIGS. 5 to 7 below.

FIG. 2 shows how in the same way 8 ODU0 are multiplexed and mapped into ODU2. The ODU2 payload is subdivided into 8 bytewise interleaved tributary slots TS1-TS8, which are assigned to the 8 ODU0s. It has to be noted that the ODU0 floats in ⅛ of the payload area of the ODU2. An ODU0 will cross multiple ODU2 frame boundaries. A complete ODU0 frame (15296 bytes) requires the bandwidth of one tributary slot in 15296/1904=8,0336 ODU2 frames. This is not illustrated in FIG. 2. The OPU2 overhead contains one column of justification control and opportunity overhead for each of the 8 tributary slots in a 8-frame multiframe format. This is also not shown in FIG. 2.

FIG. 3 shows schematically how 32 ODU0 are multiplexed and mapped into ODU3. The ODU3 payload is subdivided into 32 bytewise interleaved tributary slots TS1-TS32, which are assigned to the 32 ODU0s. Similarly to the examples before, the ODU0 floats in 1/32 of the payload area of the ODU3.

An ODU0 will cross multiple ODU3 frame boundaries. A complete ODU0 frame (15296 bytes) requires the bandwidth of one tributary slot in 15296/476=32,1345 ODU2 frames. This is not illustrated in FIG. 3. The OPU3 overhead contains also one column of justification control and opportunity overhead for each of the 32 tributary slots in a 32-frame multiframe format, which is also not shown in FIG. 3.

While FIGS. 1 to 3 show only mapping of lower layer ODUs of the same type into higher layer ODUs, it should be clear to those skilled in the art, that also a mixed mapping would be possible. Therefore, a suitable mix of transport signals built from ODU0 and ODU1 can be multiplexed into one transport signal built from ODU2. Equally, a suitable mix of transport signals built from ODU0, ODU1 and ODU2 can be multiplexed into one transport signal built from ODU3.

Moreover, FIGS. 1-3 show only 1 GE signals as client layer signals. While this is indeed the preferred embodiment of the invention, it should be clear, however, that once the ODU0 has been introduced, it might be used for a variety of client layer signals having a suitable data rate.

In order to transport the ODU0 over a fiber in a OTM-0.0 signal, or over a wavelength in a multi-wavelength optical signal (OTM-nr.m (m=0, 1, 2, 3) or OTM-n.m), an Optical Channel Transport Unit-0 (OTU0) is defined that carries the ODU0. The OTU0 is an OTUk with k=0. The OTU0 bit rate is: 4080/3824*1,244160 1,327451046 Gbit/s∓20 ppm.

Figure 4:
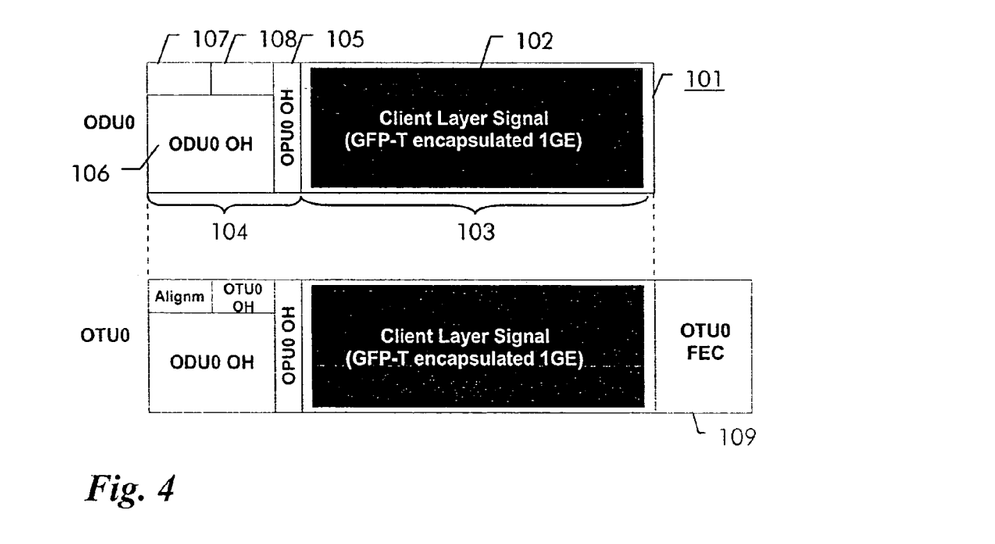
FIG. 4 shows an ODU0 and its associated transport unit OTU0 with a GFP-T encapsulated 1GE client layer signal.

FIG. 4 illustrates the mapping of an ODU0 101 into such OTU0. The OTU0 contains an additional area 109 for forward error correction code (FEC) as well as OTU0 overhead and alignment bytes, which are entered into the reserved fields 107, 108 in the overhead area 104.

ODU0 into OPUk Tributary Slot Mapping

An OPUk Tributary Slot represents a bandwidth of 238/(239-k)*1,244160 Gbit/s±20 ppm. The ODU0 has a bandwidth of 1,244160 Gbit/s±20 ppm. The OPU1 Tributary Slot bandwidth equals the ODU0 bandwidth, whereas the OPU2 and OPU3 Tributary Slot bandwidth is larger than the ODU0 bandwidth. The ratio is the same as for the case of STM-N into ODUk, and the ODU0 into OPUk Tributary Slot mapping design with fixed stuff columns known from the mapping of STM-N into OPUk can be re-used here.

Figure 5:
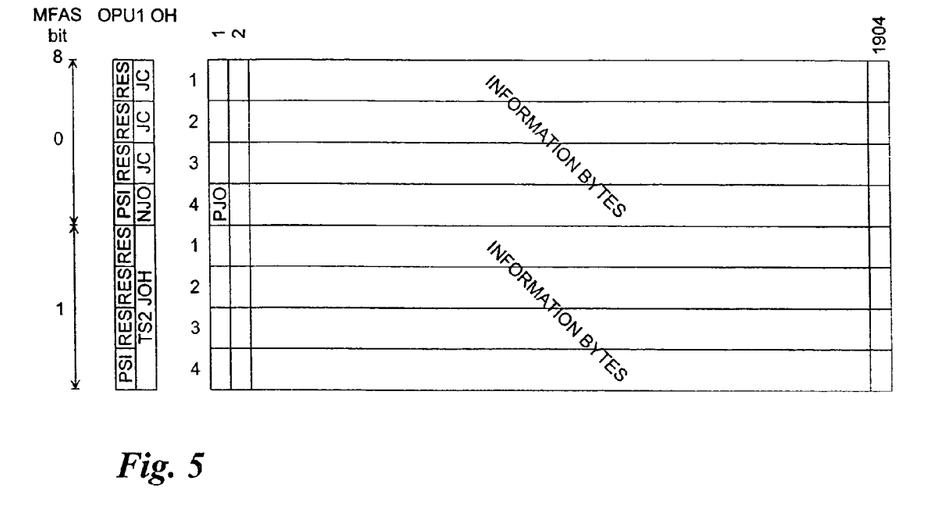
FIG. 5 shows the mapping of ODU0 into an OPU1 tributary slot TS1.

FIG. 5 shows an ODU0 mapped into one of the two ODU1 tributary slots. In particular, an ODU0 is mapped into an OPU1 Tributary Slot without any fixed stuff columns. The OPU1 Tributary Slot has 1904 columns, all carrying ODU0 bytes. In addition the OPU1 overhead in columns 15 and 16 of the overhead area of the ODU1 is shown. The overhead bytes have the same meaning and function as described in ITU-T G.709.

Figure 6:
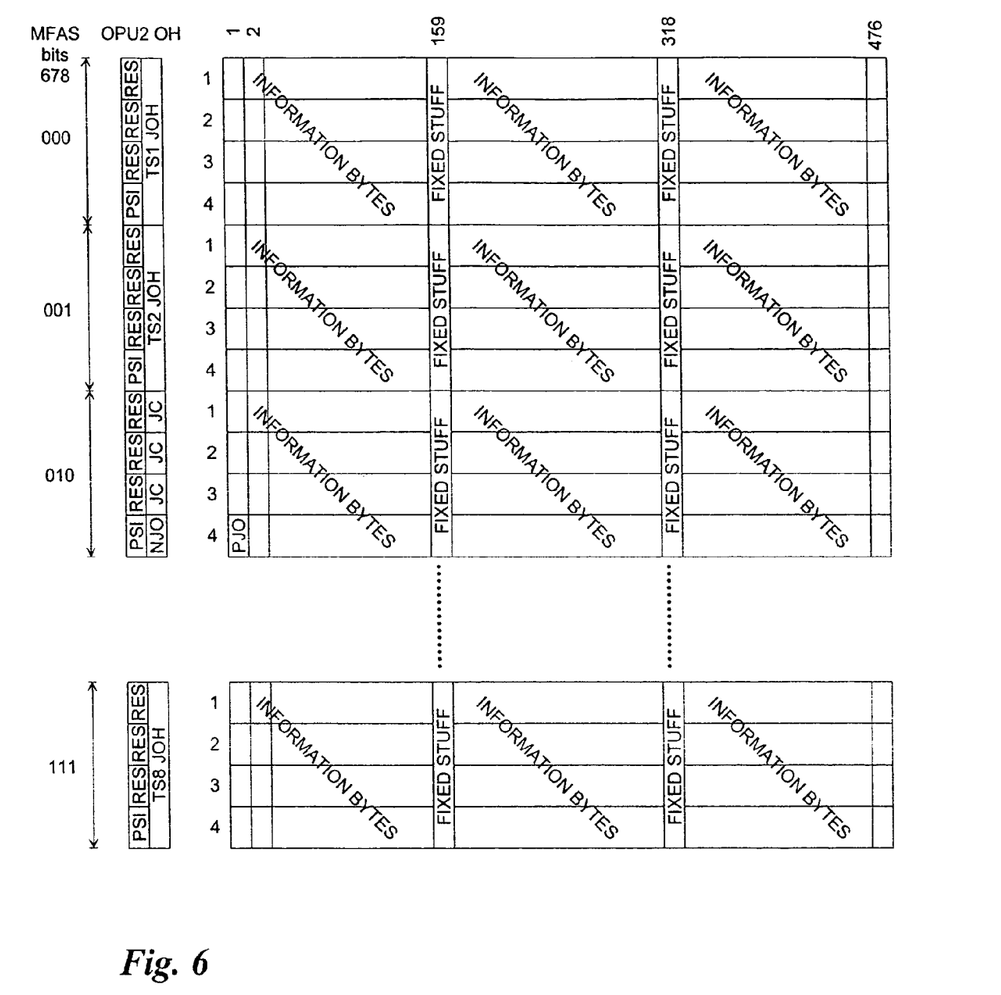
FIG. 6 shows the mapping of ODU0 into an OPU2 tributary slot TS3.

FIG. 6 shows the mapping of an ODU0 into a tributary timeslot of an ODU2. The ODU0 is mapped into an OPU2 Tributary Slot with two fixed stuff columns, i.e., a total of 64 fixed stuff bytes per 8 OPU2 frames. The OPU2 Tributary Slot has 476 columns. A preferred way to organize the fixed stuff columns is with 158 columns of ODU0 bytes, 1 column of fixed stuff bytes, 158 columns of ODU0 bytes, 1 column of fixed stuff bytes and 158 columns of ODU0 bytes (see FIG. 6).

Figure 7:
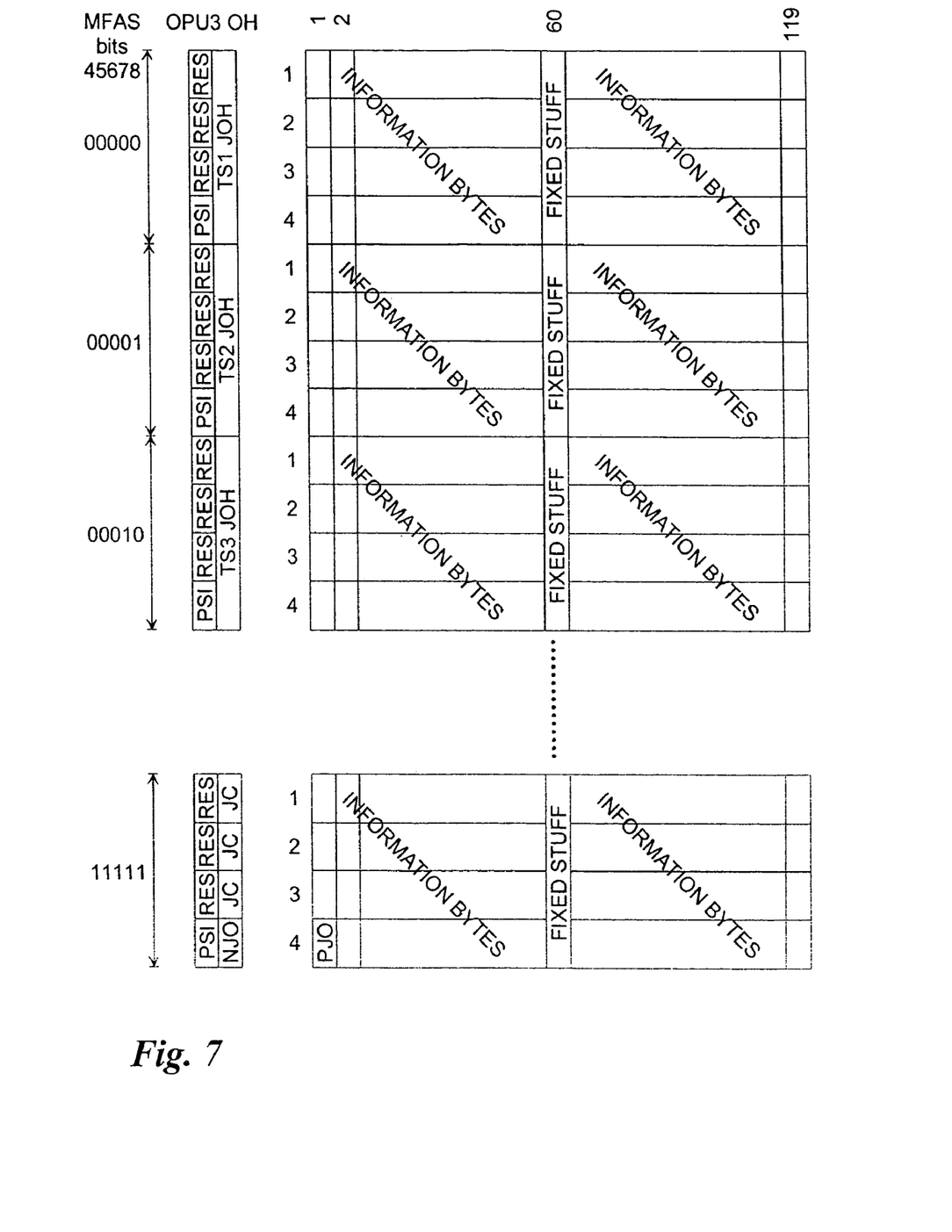
FIG. 7 shows the mapping of ODU0 into an OPU3 tributary slot TS32.

FIG. 7 shows the mapping of an ODU0 into a tributary timeslot of an ODU3. The ODU0 is mapped into an OPU3 Tributary Slot with one fixed stuff column, i.e., a total of 128 fixed stuff bytes per 32 OPU3 frames. The OPU3 Tributary Slot has 119 columns, and can preferably be organized as 59 columns of ODU0 bytes, 1 column of fixed stuff bytes and 59 columns of ODU0 bytes (see FIG. 7).

ODU0 Justification Control and Opportunity

Each OPU1 Tributary Slot has associated Justification Overhead (JOH) consisting of three bytes of Justification Control (JC) overhead, one byte of Negative Justification Opportunity (NJO) overhead and one byte of Positive Justification Opportunity (PJO) overhead. The JC and NJO overhead is located in the OPUj OH, as shown in FIGS. 5 to 7. The PJO overhead location is located in row 4, column 1 of the tributary slot.

With two ODU0s per ODU1, there is one justification opportunity per two ODU1 frames (see FIG. 5) for each of the ODU0s. For the case of eight ODU0s into OPU2, there is one justification opportunity per eight ODU2 frames (see FIG. 6) for each of the ODU0s, and for thirty-two ODU0s into OPU3 there is one justification opportunity per thirty-two ODU3 frames (see FIG. 7) for each of the ODU0s.

The ODU0 has a bit rate which is 50% of the STM-16 bit rate (STM: Synchronous Transport Module used for SDH), 12.5% of the STM-64 bit rate and 3.125% of the STM-256 bit rate. The OPU1 Tributary Slot bandwidth is 50% of the OPU1 payload bandwidth, the OPU2 tributary slot bandwidth is 12.5% of the OPU2 payload bandwidth and the OPU3 tributary slot bandwidth is 3.125% of the OPU3 payload bandwidth. Given that the ODU0 to OPUk tributary slot bandwidth relation is similar to the STM-N to OPUk payload bandwidth relation, the ODU0 mapping into an OPUk tributary slot will require the same justification capabilities as for the STM-N mapping into OPUk payload. This implies that a −1/0/+1 justification scheme suffices, requiring one NJO and one PJO byte. The general ODU multiplexing justification scheme supports a −1/0/+1/+2 justification scheme with one NJO byte and two PJO bytes. Multiplexing of ODU0 will therefore typically not make use of the second PJO byte.

Multiplex Structure Identifier

The OTN supports the multiplexing of multiple ODUk types into the payload of an ODUj (j>k). The allocation of an ODUk onto an OPUj tributary slot is flexible and is indicated in the encoding of the OPUj Multiplex Structure Identifier (MSI) overhead field.

The existing MSI definition in ITU-T G.709 is not capable to identify the ODU0 as a tributary signal. Therefore the MSI overhead definition needs to be extended and this extended multiplex structure is to be identified by an additional Payload Type (PT) value, e.g. value 0x21 (ODU multiplex structure with ODU0 capability). The existing PT value of 0x20 is renamed into "ODU multiplex structure ODUk, k>=1".

The MSI definition associated with PT value 0x21 supports up to 32 OPUj Tributary Slots, in which an ODU0 occupies 1 tributary slot, an ODU1 occupies 2 tributary slots and an ODU2 occupies 8 tributary slots.

Figure 8:
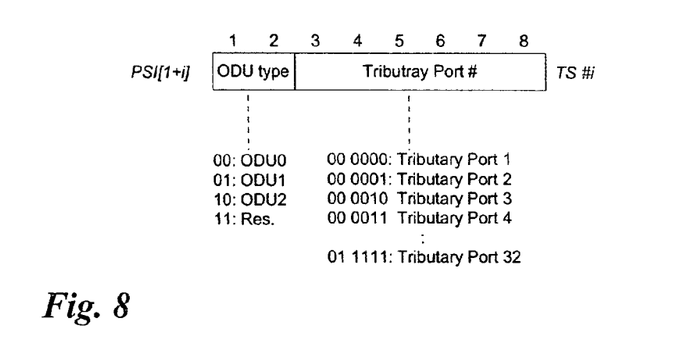
FIG. 8 shows Multiplex Structure Identifier encoding for payload type value 0x21 defined for ODU0.

The MSI indicates the content of each tributary slot of an OPU. The generic coding for each tributary slot is shown in FIG. 8. One byte is used for each tributary slot. Bits 1 and 2 indicate the ODU type transported in the tributary slot. Bits 3 to 8 indicate the tributary port of the ODU transported. This is of interest in case of flexible assignment of ODUs to tributary slots (e.g. ODU2 into OPU3). In case of fixed assignment the tributary port number corresponds to the tributary slot number.

A potential future ODU4/OPU4, that may have 128 tributary slots, will require a 7-bit tributary port field, and the encoding of ODU type and tributary port number will then require at least 9 bits.

Impact on Network Elements

The impact on network elements will be discussed below. First of all, network elements terminating a transport signal built from or containing ODU0 must be capable to handle this new type of signal, i.e., to terminate and process the overhead, adopt the rate by byte justification, encapsulate as well as extract payload signals (i.e., GFP-T encoded 1 GE signals) and generate in reverse direction new ODU0. This will typically be done in certain I/O ports of the network element. Thus, the I/O section of at least some network elements in the Optical Transport Network will be modified accordingly. The implementation of these modifications as such will be readily apparent to those having ordinary skill in the art having read and understood the above specification and definition of the ODU0 structure and its overhead.

Moreover, network elements are required that allow the multiplexing of ODU0 into higher layer ODUk (k>0) as described above. Therefore, multiplexers will be provided in certain network elements which are capable of multiplexing ODU0 into higher layer ODUk. Such multiplexers will need to perform a rate adaptation as explained above as well as insertion of two or one fixed stuff columns per frame in the case of ODU2 and ODU3, respectively.

In addition, the definition of ODU0 allows to switch ODU0 signals independently which leads to greater flexibility in the network. This switching will typically be performed by network elements referred to as Optical Crossconnects. These network elements have switch matrices that allow to switch ODUk entities in space and time and potentially also wavelength from any to any I/O port. In order to allow switching at ODU0 layer, some of these network elements will thus have a switch matrix that is adapted to switch transport signals from any to any I/O port at the granularity of the new ODU0 entities. How this can be implemented using state-of-the-art ASIC technology will be readily apparent to those having ordinary skill in the art.

It should be noted, that the aforementioned modifications can also be combined in one network element. Moreover, it should be noted that an Optical Transport Network is not required to support all multiplex layers defined for the OTH. Instead, an Optical Transport Network can be designed to handle for instance only ODU1 or only ODU1 and ODU2 but no ODU3. Consequently, the network elements according to the invention will have to support at least one of the three previously existing layers k=1, 2, or 3 and in addition the new layer k=0. Obviously, future network elements will additionally support higher multiplex layers (k>3) that may be defined in the future once the need for higher bit rates will arise.

What is claimed is:

1. A method of transporting client layer signals over an Optical Transport Network, said Optical Transport Network being designed for the transport of optical transport signals structured in accordance with the Optical Transport Hierarchy, the Optical Transport Hierarchy providing at least three multiplex layers k with k=1, 2, and 3 and defining corresponding Optical Channel Data Units-k, wherein said Optical Channel Data Units-k with k=1, 2, and 3 are of a size that four transport signals built from Optical Channel Data Units of a lower layer can be multiplexed into one transport signal built from Optical Channel Data Units of the next higher layer, wherein each Optical Channel Data Unit-k comprises an overhead area and a payload area; wherein said Optical Transport Network supports at least said multiplex layer k=1 and corresponding Optical Channel Data Units-1, the Optical Transport Hierarchy further defining Optical Channel Payload Units-k, and said Optical Transport Network including switching elements capable of switching Optical Channel Data Units-k between ports of the switching element in accordance with the Optical Transport Hierarchy; and wherein said method comprises the steps of generating an optical transport signal built from first and second Optical Channel Data Units-0 and a selected higher level Optical Channel Data Unit, the Optical Channel Data Units-0 being such that two transport signals built from Optical Channel Data Units-0 can be multiplexed into one transport signal built from Optical Channel Data Units-1, the structure of each Optical Channel Data Unit-0 including a payload area;

mapping first and second of said client layer signals, including any overhead of the client layer signals, into the payload areas of said first and second Optical Channel Data Units-0, respectively;

providing additionally in each of the Optical Channel Data Units-0 an Optical Channel Payload Unit-0-specific overhead area structured to perform functions of an Optical Channel Payload Unit overhead of the Optical Transport Hierarchy;

providing additionally in each of the Optical Channel Data Units-0 an Optical Channel Data Unit-0-specific overhead area structured to perform functions of an Optical Channel Data Unit overhead of the Optical Transport Hierarchy;

multiplexing the first and second Optical Channel Data Units-0 into a payload area of the selected higher level Optical Channel Data Unit; and making an entry in an overhead area of the selected higher level Optical Channel Data Unit that enables a switching element in the Optical Transport Network which switches in accordance with the Optical Transport Hierarchy to treat the first and second Optical Channel Data Units-0 as distinct Optical Transport Hierarchy units and to switch them individually according to the Optical Transport Hierarchy.

2. A method according to claim 1 wherein said client layer signal is a 1 Gbits/s Ethernet signal and wherein said method comprises the step of encapsulating said 1 Gbits/s Ethernet signal according to a Transparent Generic Framing Procedure.

3. A method according to claim 1 comprising the step of multiplexing two transport signals built from Optical Channel Data Units-0 into one transport signal built from Optical Channel Data Units-1.

4. A method according to claim 1 comprising the steps of multiplexing eight transport signals built from Optical Channel Data Units-0 into one transport signal built from Optical Channel Data Units-2, and filling two of 476 columns of a tributary slot of said Optical Channel Data Units-2 with fixed stuff bytes.

5. A method according to claim 1 comprising the steps of multiplexing 32 transport signals built from Optical Channel Data Units-0 into one transport signal built from Optical Channel Data Units-3, and filling one of 119 columns of a tributary slot of said Optical Channel Data Units-3 with fixed stuff bytes.

6. A network element for an Optical Transport Network, said network element being designed to handle optical transport signals structured in accordance with the Optical Transport Hierarchy, the Optical Transport Hierarchy providing at least three multiplex layers k with k=1, 2, and 3 and defining corresponding Optical Channel Data Units-k, wherein said Optical Channel Data Units-k with k=1, 2, and 3 are of a size that four transport signals built from Optical Channel Data Units of a lower layer can be multiplexed into one transport signal built from Optical Channel Data Units of the next higher layer, wherein each Optical Channel Data Units-k comprises an overhead area and a payload area; wherein said network element supports at least said multiplex layer k=1 and corresponding Optical Channel Data Units-1, the Optical Transport Hierarchy further defining Optical Channel Payload Units-k, and said Optical Transport Network including switches capable of switching Optical Channel Data Units-k between ports of the switch in accordance with the Optical Transport Hierarchy; and wherein said network element comprises at least one I/O port for processing a transport signal built from first and second Optical Channel Data Units-0 and a selected higher level Optical Channel Data Unit, the Optical Channel Data Units-0 being such that two transport signals built from Optical Channel Data Units-0 can be multiplexed into one transport signal built from Optical Channel Data Units-1, the structure of each Optical Channel Data Unit-0 including a payload area, and in addition, an Optical Channel Data Unit-0-specific overhead, and an Optical Channel Payload Unit-0-specific overhead area, said specific overhead areas structured to perform functions of an Optical Channel Data Unit overhead and an Optical Channel Payload Unit overhead, respectively, of the Optical Transport Hierarchy;

means for mapping first and second client layer signals, including any overhead of the client layer signals, into the payload areas of said first and second Optical Channel Data Units-0, respectively; and means for multiplexing the first and second Optical Channel Data Units-0 into the payload area of the selected higher level Optical Channel Data Unit, with an entry in an overhead area of the selected higher level Optical Channel Data Unit that enables a switching element in the Optical Transport Network which switches in accordance with the Optical Transport Hierarchy to treat the first and second Optical Channel Data Units-0 as distinct Optical Transport Hierarchy units and to switch them individually according to the Optical Transport Hierarchy.

7. A network element according to claim 6 comprising an Ethernet interface for receiving a 1 Gbits/s Ethernet signal, means for encapsulating said 1 Gbits/s Ethernet signal according to a Transparent Generic Framing Procedure and means for mapping said encapsulated 1 Gbits/s Ethernet signal into the payload areas of said Optical Channel Data Units-0.

8. A network element according to claim 6, comprising a switch matrix adapted to switch transport signals from any to any I/O port of said network element at a granularity of said Optical Channel Data Units-0.

9. A network element according to claim 6, comprising at least one multiplexer for multiplexing two or more transport signals built from Optical Channel Data Units-0 into one transport signal built from Optical Channel Data Units of a higher layer.

10. A method of transporting a client layer signal over an Optical Transport Network, said Optical Transport Network being designed for the transport of optical transport signals structured in accordance with the Optical Transport Hierarchy, the Optical Transport Hierarchy providing at least three multiplex layers k with k=1, 2, and 3 and defining corresponding Optical Channel Data Units-k, wherein said Optical Channel Data Units-k with k=1, 2, and 3 are of a size that four transport signals built from Optical Channel Data Units of a lower layer can be multiplexed into one transport signal built from Optical Channel Data Units of the next higher layer; wherein each Optical Channel Data Unit-k comprises an overhead area and a payload area; wherein said Optical Transport Network supports at least said multiplex layer k=1 and corresponding Optical Channel Data Units-1, wherein said method comprises the steps of generating an optical transport signal built from Optical Channel Data Units-0, the structure of each Optical Channel Data Unit-0 including a payload area;

mapping client layer signals into the payload areas of said Optical Channel Data Units-0;

providing additionally in each of the Optical Channel Data Units-0 an Optical Channel Data Unit-0-specific overhead structured to perform functions of an Optical Channel Data Unit overhead in the Optical Transport Hierarchy;

for Optical Channel Data Units-k, for k=1, 2, and 3, providing a number of tributary timeslots for the payload area thereof, with the number of timeslots including 2 timeslots for k=1, 8 timeslots for k=2, and 32 timeslots for k=3;

multiplexing the optical transport signal built from Optical Channel Data Units-0 into tributary timeslots of any selected one of the higher level Optical Channel Data Unit-k; and providing a structure identifier in an Optical Channel Payload Unit-0 overhead area of the selected higher layer Optical Channel Data Unit-k, said identifier including bits corresponding to each tributary slot, indicating the content of the corresponding tributary slot and identifying the Optical Channel Data Unit types of tributary slots carrying said Optical Channel Data Units-0 as Optical Channel Data Unit-0.

11. A method of transporting a client layer signal over an Optical Transport Network, said Optical Transport Network being designed for the transport of optical transport signals structured in accordance with the Optical Transport Hierarchy, said Optical Transport Hierarchy providing at least three multiplex layers k with k=1, 2, and 3 and defining corresponding Optical Channel Data Units-k, wherein said Optical Channel Data Units-k with k=1, 2, and 3 are of a size that four transport signals built from Optical Channel Data Units of a lower layer can be multiplexed into one transport signal built from Optical Channel Data Units of the next higher layer; wherein each Optical Channel Data Unit-k comprises an overhead area and a payload area; wherein said Optical Transport Network supports at least said multiplex layer k=1 and corresponding Optical Channel Data Units-1; wherein said method comprises the steps of generating a transport signal built from Optical Channel Data Units-0, which are such that two transport signals built from Optical Channel Data Units-0 can be multiplexed into one transport signal built from Optical Channel Data Units-1, mapping said client layer signal into the payload areas of said Optical Channel Data Units-0;

multiplexing said Optical Channel Data Units-0 into higher layer Optical Channel Data Units-k, said higher layer Optical Channel Data Units-k comprising tributary slots, which are of a size that fits to the size of said Optical Channel Data Units-0; and providing a Multiplex Structure Identifier in an overhead field of said higher layer Optical Channel Data Units-k, said Multiplex Structure Identifier including one byte per tributary slot indicating the content of the corresponding tributary slot and identifying the Optical Channel Data Unit types of the tributary slots carrying said Optical Channel Data Units-0 as Optical Channel Data Unit-0.

12. A network element for an Optical Transport Network, said network element being designed to handle optical transport signals structured in accordance with the Optical Transport Hierarchy, the Optical Transport Hierarchy providing at least three multiplex layers k with k=1, 2, and 3 and defining corresponding Optical Channel Data Units-k, wherein said Optical Channel Data Units-k with k=1, 2, and 3 are of a size that four transport signals built from Optical Channel Data Units of a lower layer can be multiplexed into one transport signal built from Optical Channel Data Units of the next higher layer; wherein each Optical Channel Data Units-k comprises an overhead area and a payload area; wherein said network element supports at least said multiplex layer k=1 and corresponding Optical Channel Data Units-1, wherein said network element comprises at least one I/O port for processing a transport signal built from Optical Channel Data Units-0, the structure of each Optical Channel Data Unit-0 including a payload area, and in addition, an Optical Channel Data Unit-0-specific overhead structured to perform functions of an Optical Channel Data Unit overhead in the Optical Transport Hierarchy;

means for mapping client layer signals into the payload areas of said Optical Channel Data Units-0; and means for multiplexing, in Optical Channel Data Units-k, for k=1, 2, and 3, into a number of tributary timeslots in the payload area thereof, with the number of timeslots including 2 timeslots for k=1, 8 timeslots for k=2, and 32 timeslots for k=3;

means for multiplexing the optical transport signal built from Optical Channel Data Units-0 into tributary timeslots of any selected one of the higher level Optical Channel Data Unit-k; and means for providing a structure identifier in an Optical Channel Payload Unit-0 overhead area of the selected higher layer Optical Channel Data Unit-k, said identifier including bits corresponding to each tributary timeslot indicating the content of the corresponding tributary timeslot and identifying the Optical Channel Data Unit types of tributary timeslots carrying said Optical Channel Data Units-0 as Optical Channel Data Unit-0.

13. A network element for an Optical Transport Network, said network element being designed to handle optical transport signals structured in accordance with the Optical Transport Hierarchy, said Optical Transport Hierarchy providing at least three multiplex layers k with k=1, 2, and 3 and defining corresponding Optical Channel Data Units-k, wherein said Optical Channel Data Units-k with k=1, 2, and 3 are of a size that four transport signals built from Optical Channel Data Units of a lower layer can be multiplexed into one transport signal built from Optical Channel Data Units of the next higher layer; wherein each Optical Channel Data Units-k comprises an overhead area and a payload area; wherein said network element supports at least said multiplex layer k=1 and corresponding Optical Channel Data Units-1; wherein said network element comprises at least one I/O port for processing a transport signal built from Optical Channel Data Units-0, which are such that two transport signals built from Optical Channel Data Units-0 can be multiplexed into one transport signal built from Optical Channel Data Units-1;

means for mapping a client layer signal into the payload areas of said Optical Channel Data Units-0;

means for multiplexing said Optical Channel Data Units-0 into higher layer Optical Channel Data Units-k, said higher layer Optical Channel Data Units-k comprising tributary slots, which are of a size that fits to the size of said Optical Channel Data Units-0; and means for providing a Multiplex Structure Identifier in an overhead field of said higher layer Optical Channel Data Units-k, said Multiplex Structure Identifier including one byte per tributary slot indicating the content of the corresponding tributary slot and identifying the Optical Channel Data Unit types of the tributary slots carrying said Optical Channel Data Units-0 as Optical Channel Data Unit-0.

* * * * *